United States Patent
Gormley

(10) Patent No.: US 11,993,389 B2
(45) Date of Patent: May 28, 2024

(54) AIRCRAFT PROPULSION SYSTEM INLET STRUCTURE WITH VARIABLE AIRFLOW INLET AREA

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 323 days.

(21) Appl. No.: 17/544,521

(22) Filed: Dec. 7, 2021

(65) Prior Publication Data

US 2022/0242586 A1 Aug. 4, 2022

Related U.S. Application Data

(60) Provisional application No. 63/124,375, filed on Dec. 11, 2020.

(51) Int. Cl.
*B64D 33/02* (2006.01)
*F02C 7/042* (2006.01)

(52) U.S. Cl.
CPC ............. *B64D 33/02* (2013.01); *F02C 7/042* (2013.01); *B64D 2033/0286* (2013.01); *F05D 2220/323* (2013.01)

(58) Field of Classification Search
CPC ............ B64D 33/02; B64D 2033/0246; B64D 2033/0286; F02C 7/042; F05D 2220/323
See application file for complete search history.

(56) References Cited

U.S. PATENT DOCUMENTS

| | | | |
|---|---|---|---|
| 2,876,621 A | 3/1959 | Bogert | |
| 3,066,892 A * | 12/1962 | Smith | ............ F02C 7/042 60/794 |
| 3,199,810 A | 8/1965 | Stroud | |
| 3,664,612 A | 5/1972 | Skidmore | |
| 4,132,240 A | 1/1979 | Frantz | |
| 6,276,632 B1 | 8/2001 | Sanders | |
| 6,793,175 B1 | 9/2004 | Sanders | |
| 8,690,097 B1 | 4/2014 | Huynh | |
| 10,107,196 B2 | 10/2018 | Devine | |

* cited by examiner

*Primary Examiner* — Steven M Sutherland
(74) *Attorney, Agent, or Firm* — Getz Balich LLC

(57) ABSTRACT

An assembly is provided for an aircraft propulsion system. This aircraft propulsion system assembly includes a nacelle inlet structure. The nacelle inlet structure includes an inner inlet opening, an outer inlet opening and a rotating structure. The rotating structure extends circumferentially about the inner inlet opening. The rotating structure is configured to rotate about an axis between a first position and a second position. The rotating structure at least partially closes the outer inlet opening in the first position. The rotating structure at least partially opens the outer inlet opening in the second position.

12 Claims, 9 Drawing Sheets

AIRCRAFT PROPULSION SYSTEM INLET STRUCTURE WITH VARIABLE AIRFLOW INLET AREA

This application claims priority to U.S. Patent Appln. No. 63/124,375 dated Dec. 11, 2020, which is hereby incorporated herein by reference in its entirety.

BACKGROUND

1. Technical Field

This disclosure relates generally to an aircraft propulsion system and, more particularly, to an inlet structure for the aircraft propulsion system with a variable airflow inlet area.

2. Background Information

An aircraft propulsion system includes an inlet structure and a gas turbine engine. The inlet structure directs air into the gas turbine engine. Some known inlet structures include a variable airflow inlet area for tailoring a mass flow of the air entering the gas turbine engine. While these known inlet structures have various advantages, there is still room in the art for improvement. There is a need in the art therefore for an improved inlet structure with a variable airflow inlet area.

SUMMARY OF THE DISCLOSURE

According to an aspect of the present disclosure, an assembly is provided for an aircraft propulsion system. This aircraft propulsion system assembly includes a nacelle inlet structure. The nacelle inlet structure includes an inner inlet opening, an outer inlet opening and a rotating structure. The rotating structure extends circumferentially about the inner inlet opening. The rotating structure is configured to rotate about an axis between a first position and a second position. The rotating structure at least partially closes the outer inlet opening in the first position. The rotating structure at least partially opens the outer inlet opening in the second position.

According to another aspect of the present disclosure, another assembly is provided for an aircraft propulsion system. This aircraft propulsion system assembly includes a nacelle inlet structure. The nacelle inlet structure includes a fixed area inlet opening, a variable area inlet opening and a movable structure. The movable structure at least partially forms the fixed area inlet opening and the variable area inlet opening. The movable structure is configured to move between a first position and a second position. The movable structure at least partially closes the variable area inlet opening in the first position. The movable structure at least partially opens the variable area inlet opening in the second position.

According to still another aspect of the present disclosure, another assembly is provided for an aircraft propulsion system. This aircraft propulsion system assembly includes a nacelle inlet structure. The nacelle inlet structure includes an inlet opening, a rotating structure and a static structure. The inlet opening is formed by and radially between the rotating structure and the static structure. The rotating structure is configured to rotate about an axis between a closed position and an open position. The rotating structure closes the inlet opening in the closed position. The rotating structure opens the inlet opening in the open position.

The inlet opening may be an auxiliary inlet opening. The nacelle inlet structure may also include a primary inlet opening. The rotating structure may circumscribe the primary inlet opening.

The movable structure may be configured to rotate about an axis between the first position and the second position.

The movable structure may be radially between the fixed area inlet opening and the variable area inlet opening.

The nacelle inlet structure may also include a static structure that partially forms the variable area inlet opening. The variable area inlet opening may be between the movable structure and the static structure.

The inner inlet opening may be formed by an inner bore of the rotating structure.

The inner inlet opening may be a fixed area opening.

The inner inlet opening may be a non-annular opening. Alternatively, the inner inlet opening may be an annular opening.

The rotating structure may form an outer peripheral boundary of the inner inlet opening. The rotating structure may also or alternatively form an inner peripheral boundary of the outer inlet opening.

The aircraft propulsion system assembly may also include a duct fluidly coupled in parallel with the inner inlet opening and the outer inlet opening.

The axis may be coaxial with an axial centerline of the nacelle inlet structure. Alternatively, the axis may be non-coaxial with the axial centerline of the nacelle inlet structure.

The rotating structure may form an inlet lip of the nacelle inlet structure.

The nacelle inlet structure may also include a second outer inlet opening. The rotating structure may at least partially (or completely) close the second outer inlet opening in the first position. The rotating structure may at least partially (or completely) open the second outer inlet opening in the second position.

The outer inlet opening and the second outer inlet opening may be arranged on opposing sides of the inner inlet opening.

The nacelle inlet structure may also include a static structure that extends circumferentially about the rotating structure. The outer inlet opening may be radially between the rotating structure and the static structure.

A forward edge of the static structure may have a concave portion that forms an outer peripheral boundary of the outer inlet opening.

The rotating structure may include a channel that extends axially along the rotating structure. The static structure may be configured to cover the channel in the first position. The static structure may be configured to uncover the channel in the second position.

The inner inlet opening may have an inner inlet opening flow area. The outer inlet opening may have an outer inlet opening flow area that is less than the inner inlet opening flow area. Alternatively, the outer inlet opening flow area may be equal to or greater than the inner inlet opening flow area.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
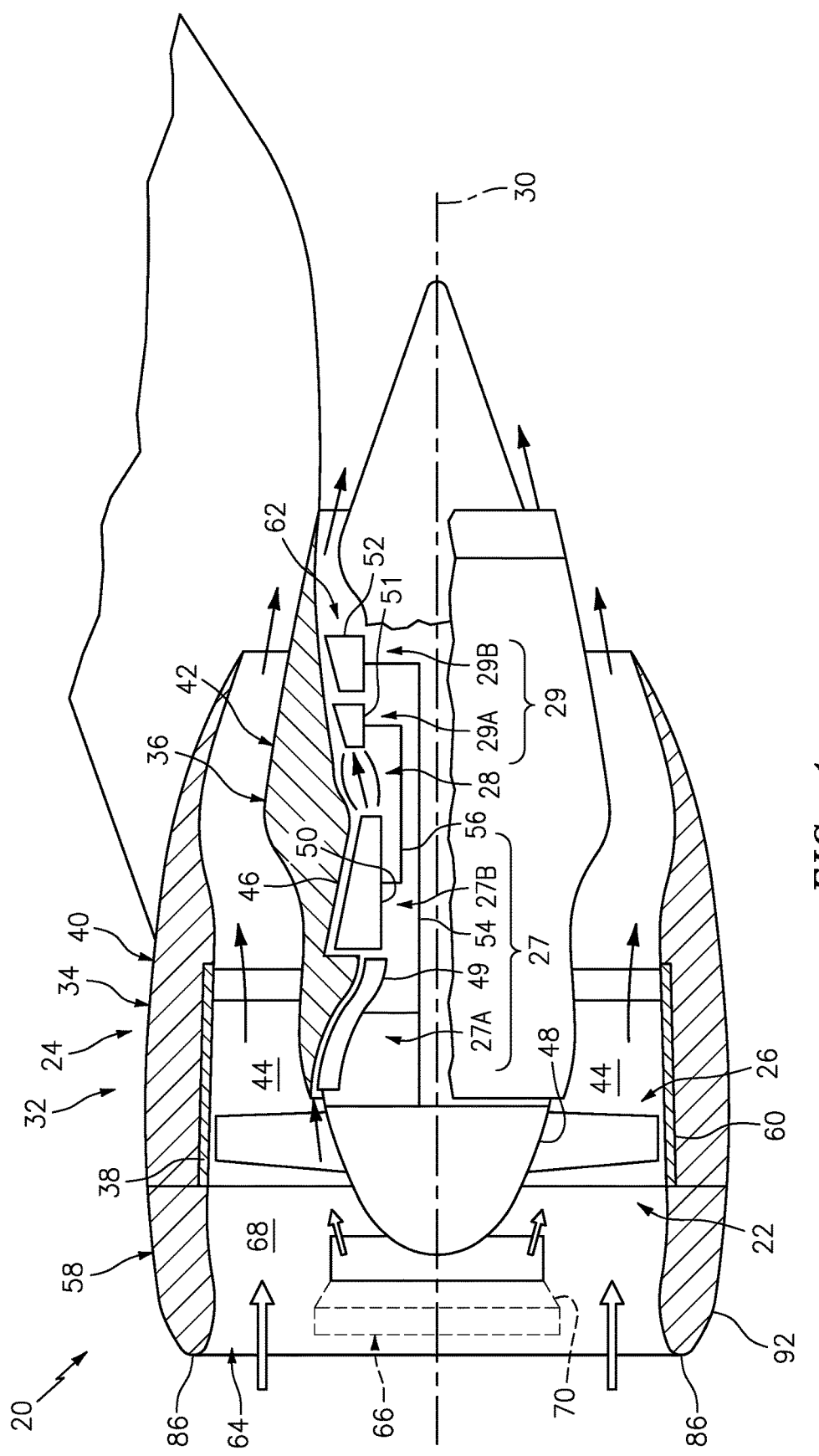
FIG. 1 is a schematic side cutaway illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; i.e., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; i.e., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flow path 44 within the aircraft propulsion system 20.

The inner housing structure 36 includes an inner case 46 (e.g., a core case) and the inner nacelle structure 42. The inner case 46 houses one or more of the engine sections 27A-29B, which engine sections 27A-29B may be collectively referred to as an engine core. The inner nacelle structure 42 houses and provides an aerodynamic cover for the inner case 46.

Each of the engine sections includes a bladed rotor 48-52. The fan rotor 48 and the LPC rotor 49 are connected to and driven by the LPT rotor 52 through a low speed shaft 54. The HPC rotor 50 is connected to and driven by the HPT rotor 51 through a high speed shaft 56. The shafts 54 and 56 are rotatably supported by a plurality of bearings (not shown).

Each of these bearings is connected to the aircraft propulsion system housing 32 (e.g., the inner case 46) by at least one stationary structure such as, for example, an annular support strut.

During operation, air enters the aircraft propulsion system 20 through an inlet structure 58 of the outer nacelle structure 40; i.e., a nacelle inlet structure. This air is directed through a duct 60 (e.g., a fan duct in the fan section 26) and into a core flow path 62 and the bypass flow path 44. The core flow path 62 extends axially along the axial centerline 30 within the aircraft propulsion system 20, through the engine sections 27A-29B, to a core nozzle outlet, where the core flow path 62 is radially within the inner case 46. The bypass flow path 44 extends axially along the axial centerline 30 within the aircraft propulsion system 20 to a bypass nozzle outlet, where the bypass flow path 44 is radially between the nacelle structures 34 and 36. The air within the core flow path 62 may be referred to as "core air". The air within the bypass flow path 44 may be referred to as "bypass air".

The core air is compressed by the compressor rotors 49 and 50 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 51 and 52 to rotate. The rotation of the turbine rotors 51 and 52 respectively drive rotation of the compressor rotors 50 and 49 and, thus, compression of the air received from a core airflow inlet. The rotation of the turbine rotor 52 also drives rotation of the fan rotor 48, which propels bypass air through and out of the bypass flow path 44. The propulsion of the bypass air may account for a majority of thrust generated by the turbine engine 22. The aircraft propulsion system 20 of the present disclosure, however, is not limited to the exemplary gas turbine engine configuration described above.

Optimal mass flow requirements of the air entering the aircraft propulsion system 20 through the nacelle inlet structure 58 may change depending upon one or more parameters. These parameters may include, but are not limited to, modes of operation, aircraft maneuvers and operating conditions. For example, where the aircraft flies at supersonic speeds, the nacelle inlet structure 58 may be configured to direct a first mass flow of the air into the aircraft propulsion system 20. When the aircraft flies at subsonic speeds, the nacelle inlet structure 58 may be configured to direct a second mass flow of the air into the aircraft propulsion system 20, where the second mass flow is greater than the first mass flow.

Figure 3:
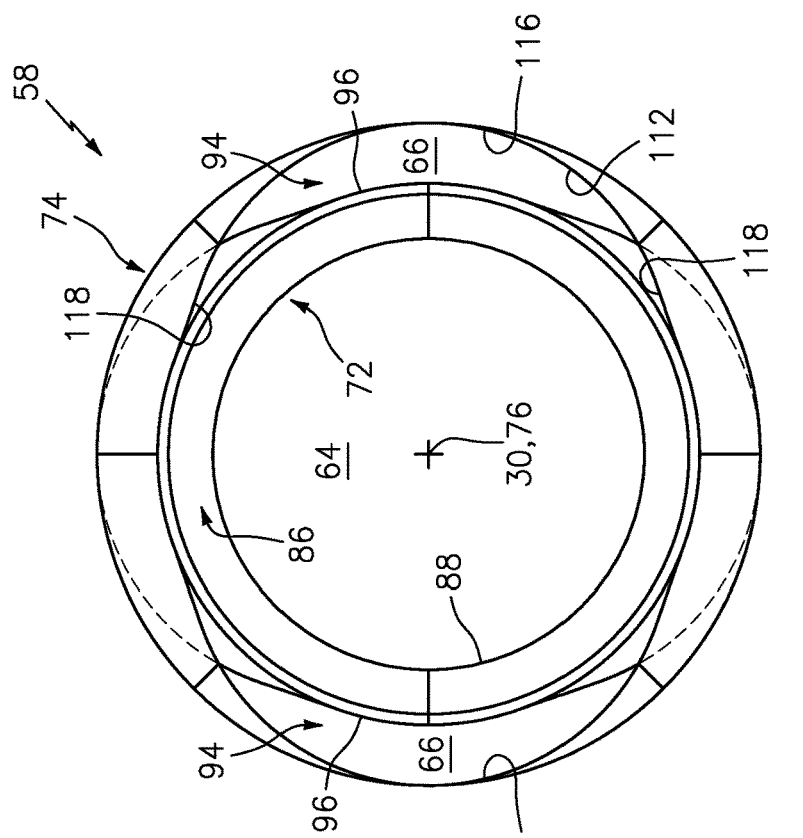
FIG. 3 is a front view illustration of the nacelle inlet structure with the movable structure in a second (e.g., fully open) position.
Figure 2:
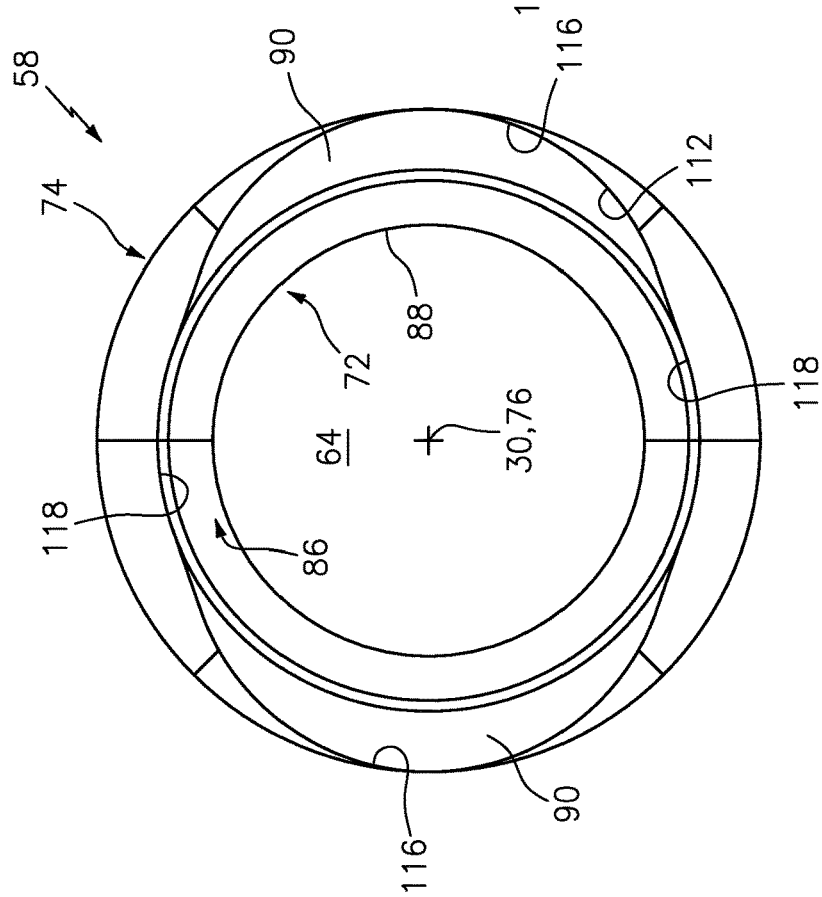
FIG. 2 is a front view illustration of a nacelle inlet structure with a movable structure in a first (e.g., fully closed) position.

To accommodate changing mass flows, the nacelle inlet structure 58 of FIGS. 2 and 3 is configured with a variable airflow inlet area. Referring to FIG. 2 for example, during a first (e.g., supersonic) mode of operation, the nacelle inlet structure 58 is configured (e.g., only) with a first inlet opening 64; e.g., a primary inlet opening, an inner inlet opening, a central inlet opening and/or a fixed area inlet opening. This first inlet opening 64 has a (e.g., maximum) first inlet opening flow area. Referring to FIG. 3, during a second (e.g., subsonic) mode of operation, the nacelle inlet structure 58 is configured with the first inlet opening 64 as well as with one or more second inlet openings 66; e.g., secondary/auxiliary inlet opening(s), outer inlet opening(s) and/or variable area inlet opening(s). Each of these second inlet openings 66 has a (e.g., maximum) second inlet opening flow area. This second inlet flow area may be less than the first inlet opening flow area. A total flow area of the second inlet openings 66 may also be less than the first inlet opening flow area. The present disclosure, however, is not limited to the foregoing exemplary relationships between the first and the second inlet opening flow areas. For example, in other embodiments, the total flow area of the second inlet openings 66 (or the second inlet flow area of each opening 66) may be equal to or greater than the first inlet opening flow area.

Figure 4:
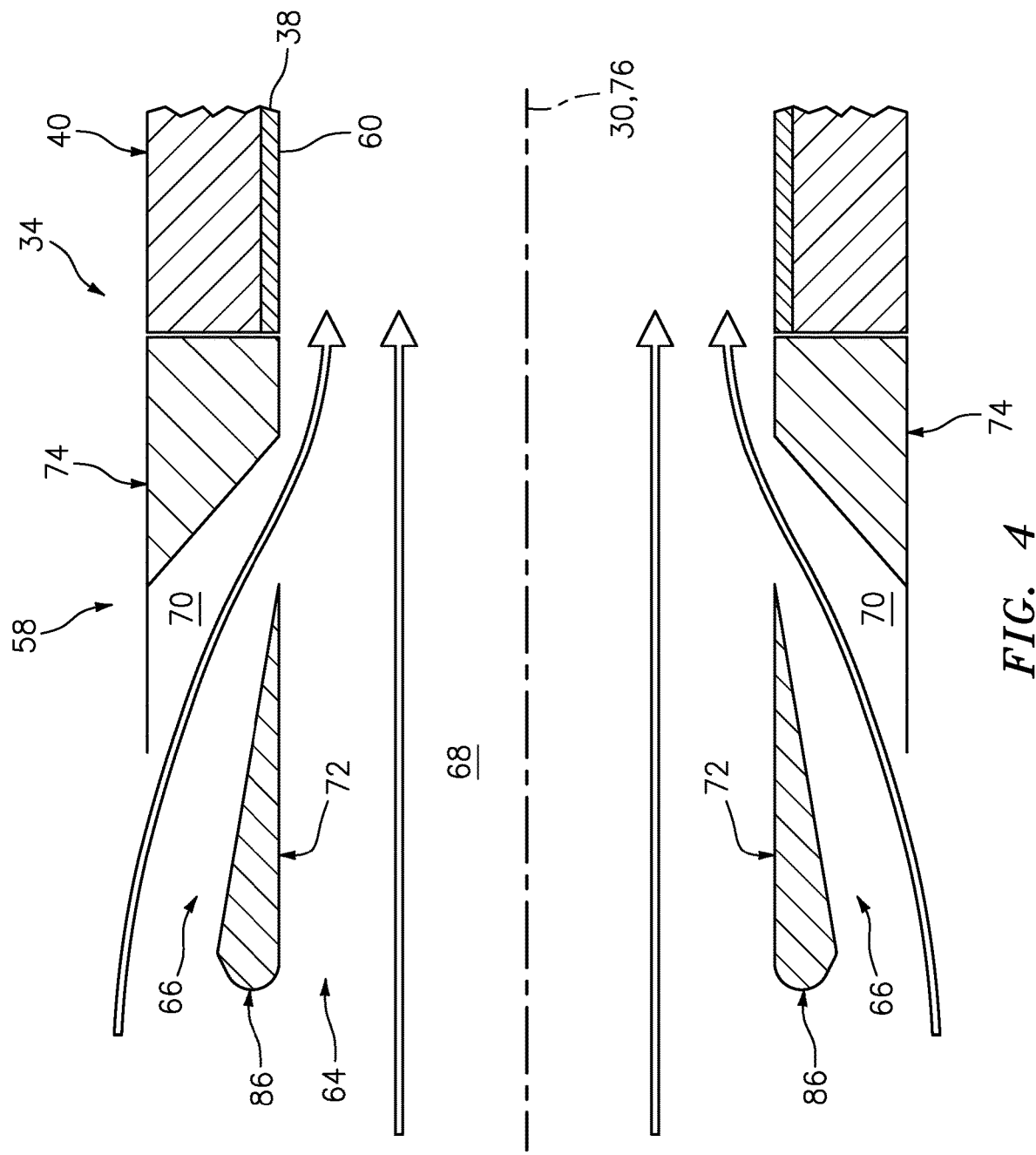
FIG. 4 is a side sectional illustration of a forward, upstream end portion of the aircraft propulsion system with the movable structure in the second position.

While the inlet openings 64 and 66 in the nacelle inlet structure 58 of FIG. 3 are discrete/fluidly isolated openings (e.g., ports), each of these inlet openings 64, 66 may be fluidly coupled with/lead to a common duct within the aircraft propulsion system 20. For example, referring to FIG. 4, the first inlet opening 64 is fluidly coupled to an upstream end of the duct 60 (e.g., a fan duct, or a compressor duct in other engine application) through a first inlet opening passage 68. Similarly, each second inlet opening 66 is fluidly coupled to the upstream end of the duct 60 through a respective second inlet opening passage 70 (see also FIG. 3). The duct of FIG. 4 therefore is fluidly coupled in parallel with first inlet opening 64 and each second inlet opening 66. The present disclosure, however, is not limited to such an exemplary arrangement. For example, in other embodiments, the first inlet opening 64 and one or more of the second inlet openings 66 may be fluidly coupled with different downstream ducts.

Figure 4B:
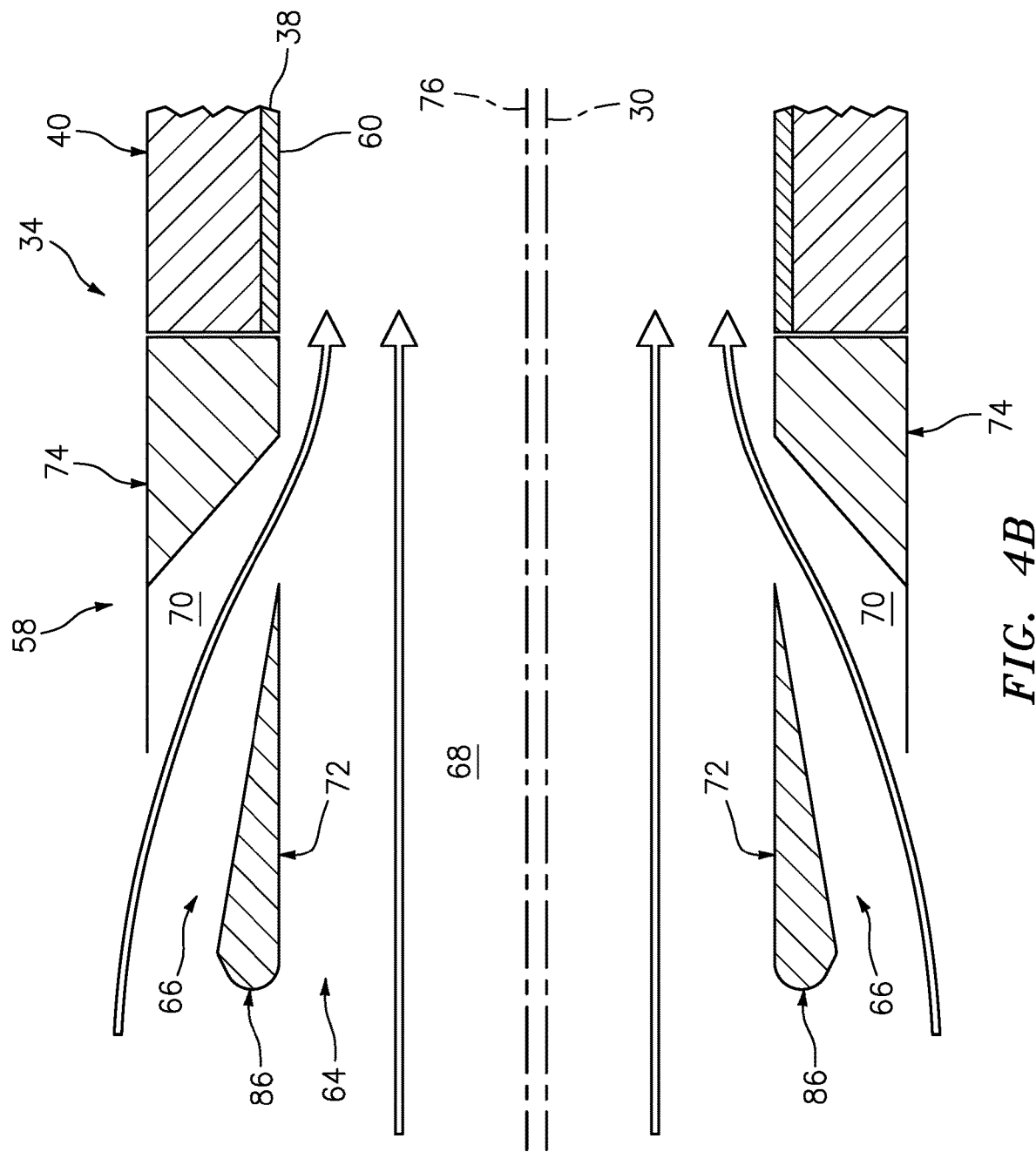
FIG. 4B is a side sectional illustration of the forward, upstream end portion of the aircraft propulsion system with a rotational axis of the moveable structure non-coaxial with an axial centerline of the propulsion system.

The nacelle inlet structure 58 of FIGS. 2 and 3 includes a movable structure 72 and a static structure 74; e.g., a stationary, fixed structure. The movable structure 72 is configured to move between a first position (e.g., fully closed position of FIG. 2) and a second position (e.g., fully open position of FIG. 3), where the movable structure 72 at least partially or completely closes one or more or all of the second inlet openings 66 in the first position of FIG. 2, and where the movable structure 72 at least partially or completely opens one or more or all of the second inlet openings 66 in the second position of FIG. 3. More particularly, the movable structure 72 of FIGS. 2 and 3 is configured as a rotatable structure which rotates (e.g., partially) clockwise or counter-clockwise about a rotational axis 76 between the first and the second positions, which rotational axis 76 may be a centerline of the movable structure 72, the static structure 74 and/or the nacelle inlet structure 58. The rotational axis 76 of FIGS. 2 and 3 is coaxial with the axial centerline 30; however, in other embodiments the axis 76 and the axial centerline 30 may be eccentric/non-coaxial (e.g., see FIG. 4B). More particularly, the rotational axis 76 may be displaced from and/or angularly offset from the axial centerline 30.

Figure 5:
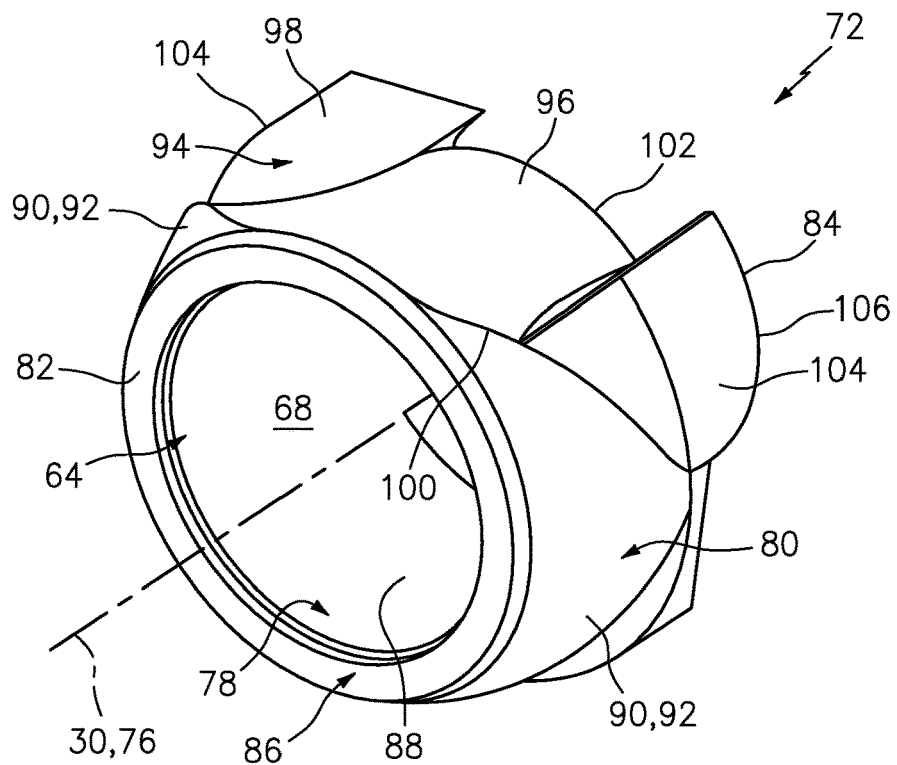
FIGS. 5 and 6 are perspective illustrations of the movable structure.
Figure 6:
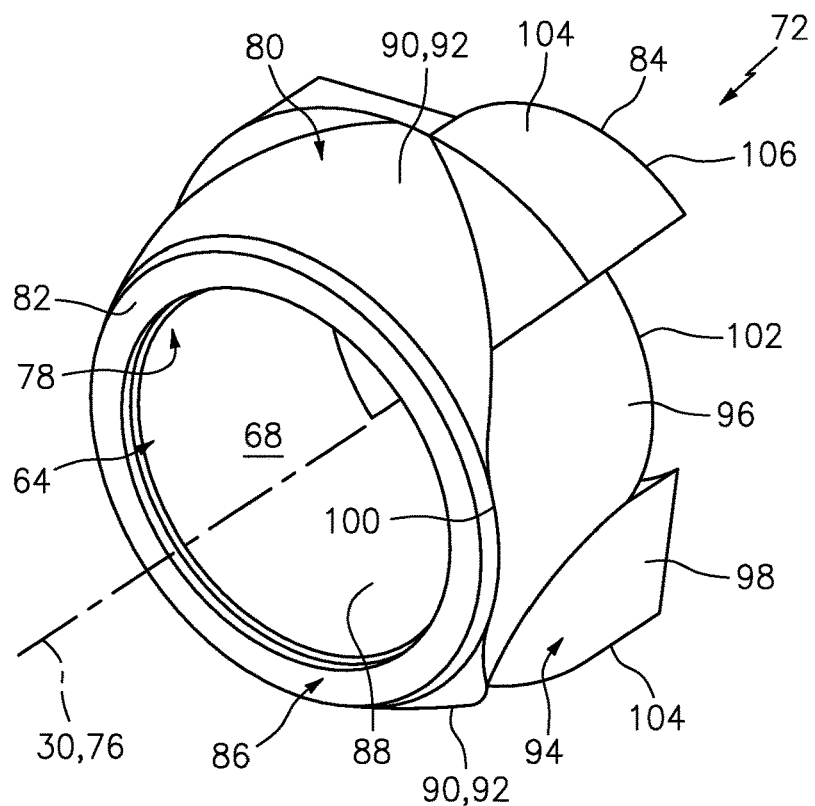

Referring to FIGS. 5 and 6, the movable structure 72 extends circumferentially about (e.g., completely around) the rotational axis 76. The movable structure 72 extends radially between a radial inner side 78 and a radial outer side 80. The movable structure 72 extends axially along the rotational axis 76 from a forward, upstream end 82 to an aft, downstream end 84, where the movable structure 72 forms an inlet lip 86 of the nacelle inlet structure 58 at the forward, upstream end 82.

The movable structure 72 includes an (e.g., tubular) inner surface 88 at the movable structure inner side 78. This inner surface 88 extends axially along the rotational axis 76 from the inlet lip 86 towards or to the aft, downstream end 84. The inner surface 88 thereby forms an inner bore through the movable structure 72. This inner bore forms the first inlet opening passage 68. The inner bore also forms an outer peripheral boundary of the first inlet opening 64 at the inlet lip 86/the forward, upstream end 82. The movable structure 72 thereby extends circumferentially about (e.g., circumscribes) and may completely define the first inlet opening 64.

The movable structure 72 includes one or more outer surfaces 90 at the movable structure outer side 80. Each of these outer surfaces 90 is configured to form a respective portion of an outer peripheral aerodynamic flow surface 92 of the nacelle inlet structure 58 (see FIG. 1). In the embodiment of FIGS. 5 and 6, each outer surface 90 has a triangular geometry; however, the present disclosure is not limited thereto.

The movable structure 72 is also configured with one or more channels 94; e.g., grooves, recesses, indentations, trenches, etc. The channels 94 are arranged on opposing sides of the movable structure 72. Each of these channels 94 projects radially into the movable structure 72 from the movable structure outer side 80 and/or the outer surface(s) 90 to a channel end surface 96. Each channel 94 extends laterally (e.g., circumferentially or tangentially) within the movable structure 72 between opposing channel side surfaces 98. Each channel 94 extends axially along and through the movable structure 72 between a forward, upstream edge 100 of the channel end surface 96 and an aft, downstream edge 102 of the channel end surface 96.

The channel end surface 96 of FIGS. 5 and 6 extends circumferentially about the rotational axis 76. The channel end surface 96 radially tapers inwards towards the rotational axis 76 as the respective channel 94 extends axially from the forward, upstream edge 100 to the aft, downstream edge 102.

Each of the channel side surfaces 98 extends axially along the channel end surface 96. Each of the channel side surfaces 98 projects (e.g., radially) out from the channel end surface 96 towards the movable structure outer side 80. In the specific embodiment of FIGS. 5 and 6, each channel side surface 98 projects to an outer surface 104 of a support member 106 (e.g., flange, etc.) of the movable structure 72. The support members 106 are configured to support movement (e.g., rotation) of the movable member relative to the static structure 74 (see FIGS. 2 and 3).

Figure 7:
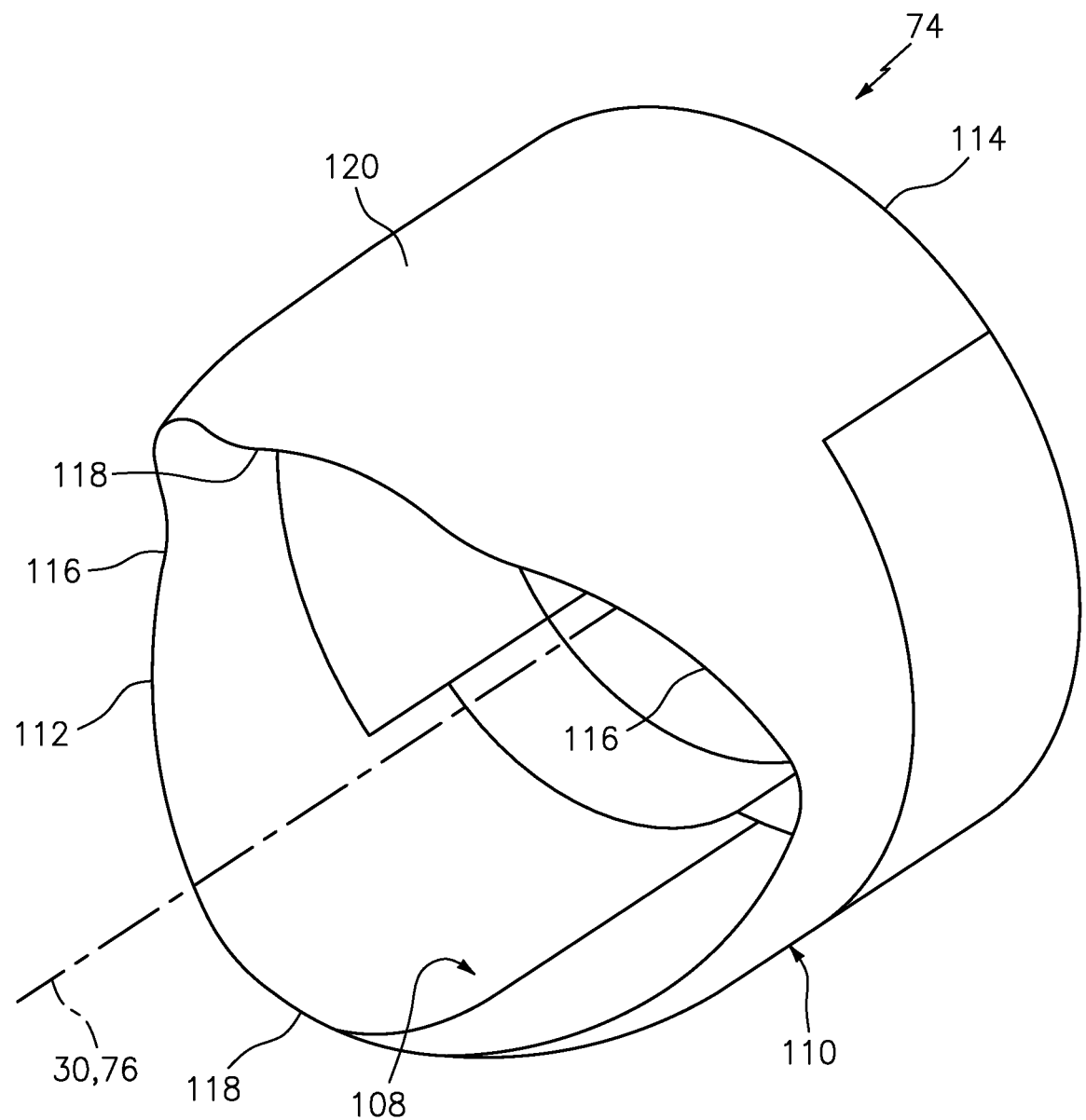
FIG. 7 is a perspective illustration of a static structure for the nacelle inlet structure.

Referring to FIG. 7, the static structure 74 extends circumferentially about (e.g., completely around) the rotational axis 76. The static structure 74 extends radially between a radial inner side 108 and a radial outer side 110. The static structure 74 extends axially along the rotational axis 76 from a (e.g., wavy and/or scalloped) forward, upstream edge 112 to an aft, downstream end 114.

The forward, upstream edge 112 of the static structure 74 includes one or more concave portions 116 and one or more convex portions 118. Each of the concave portions 116 is disposed and extends between respective ends of the convex portions 118.

The static structure 74 includes an (e.g., tubular) outer surface 120 at the static structure outer side 110. This outer surface 120 extends circumferentially about (e.g., completely around) the rotational axis 76. The outer surface 120 extends axially along the rotational axis 76 from the forward, upstream edge 112 to the aft, downstream end 114. The outer surface 120 forms another portion of the outer peripheral aerodynamic flow surface 92 of the nacelle inlet structure 58 (see FIG. 1).

Referring to FIGS. 2 and 3, the movable structure 72 is mated with (e.g., partially nested into) the static structure 74. For example, the support members 106 of the movable structure 72 (see FIGS. 5 and 6) are arranged within an inner bore of the static structure 74 (see FIG. 7). These support members 106 and/or one or more other portions of the movable structure 72 are moveably connected to the static structure 74 by, for example, one or more bearing structures, track assemblies and/or other suitable slidable/movable/pivotable connectors (not shown). With this arrangement, the static structure 74 may extend circumferentially about (e.g., circumscribe) at least an aft, downstream portion of the movable structure 72.

When the movable structure 72 is in its first position of FIG. 2, the channels 94 (see FIG. 3) are covered by the static structure 74. The movable structure 72 may thereby close the channels 94 and, thus, the second inlet openings 66. However, when the movable structure 72 is in its second position of FIG. 3, the channels 94 are uncovered by the static structure 74. The second inlet openings 66 are thereby opened in order to provide the nacelle inlet structure 58 and, thus, the aircraft propulsion system 20 with the total airflow inlet area.

In the embodiments of FIG. 3, a peripheral inner boundary of each second inlet opening 66 is formed by a respective one of the channel end surfaces 96. A peripheral outer boundary of each second inlet opening 66 is formed by a respective concave portion 116 of the forward, upstream edge 112. Each second inlet opening 66 therefore is formed by and is radially between the movable structure 72 and the static structure 74.

Figure 8A:
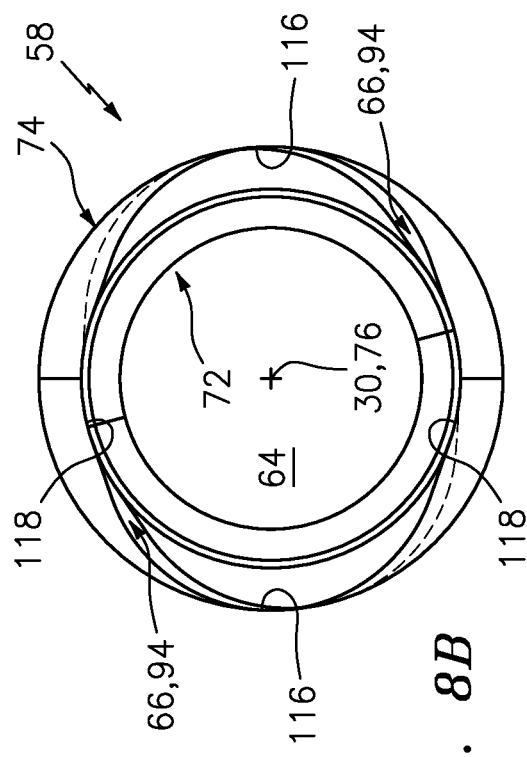
FIGS. 8A-8G illustrate a sequence of the movable structure moving relative to the static structure from the first position to the second position.
Figure 8B:
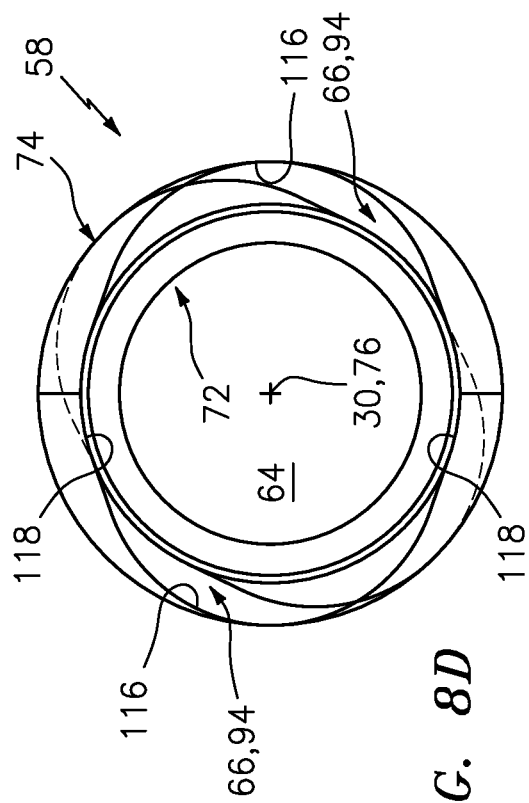
Figure 8C:
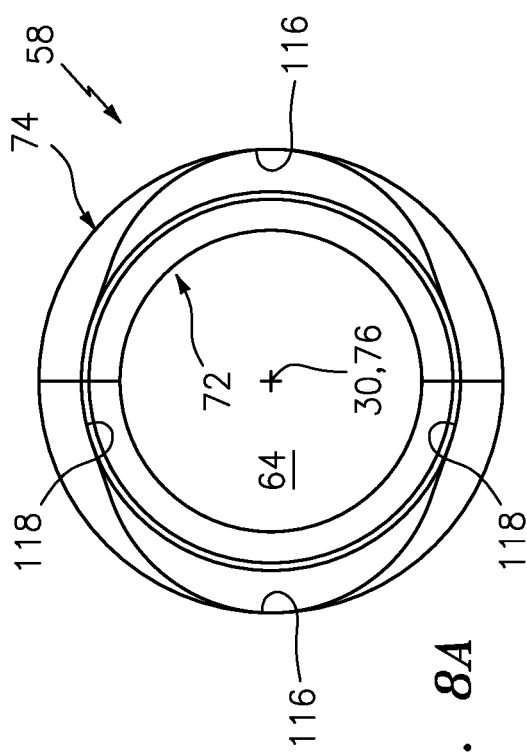
Figure 8D:
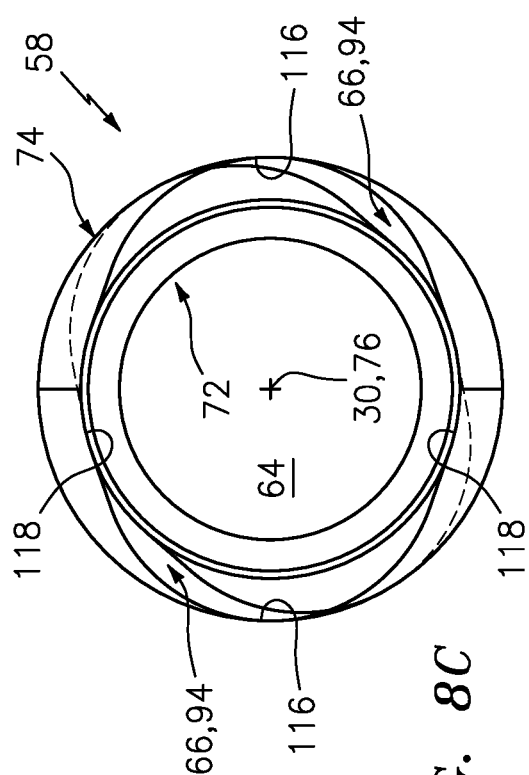
Figure 8E:
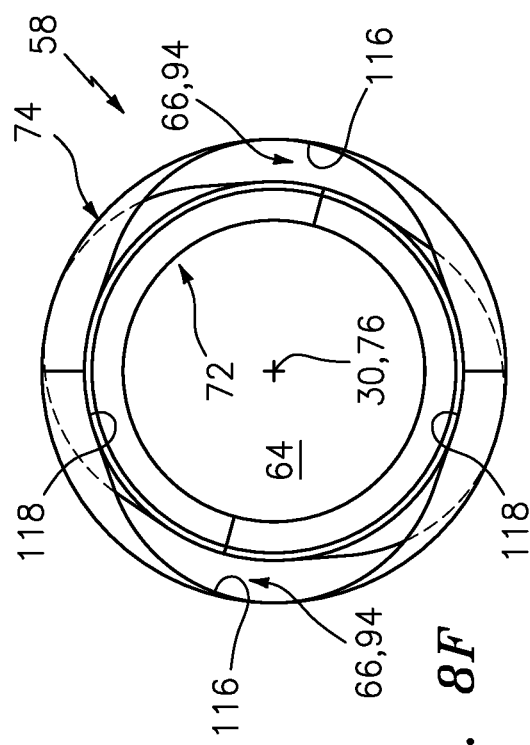
Figure 8F:
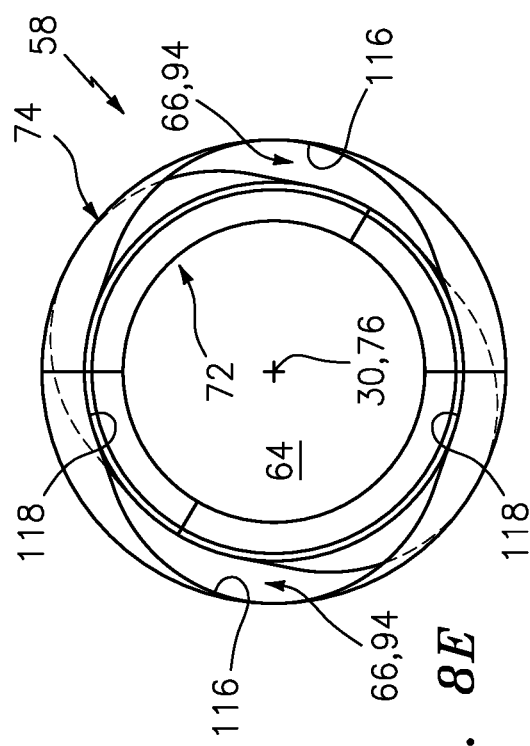
Figure 8G:
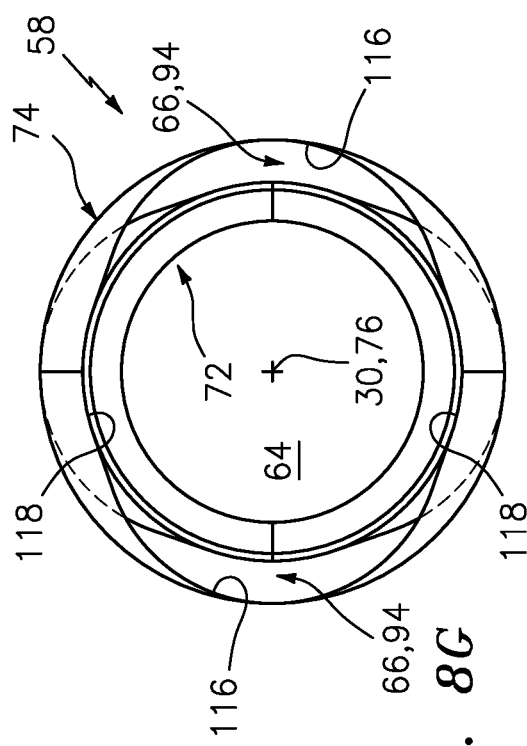

FIGS. 8A-8G illustrate a sequence of the movable structure 72 moving (e.g., rotating) from the first position of FIG. 8A (see also FIG. 2) to the second position of FIG. 8G (see also FIG. 3). During this movement, the channels 94 move (e.g., rotate) about the rotational axis 76 towards the concave portions 116 of the static structure 74 and, thus, are uncovered. The movable structure 72 thereby opens the second inlet openings 66 while maintaining the first inlet opening 64 with a fixed area.

Figure 9:
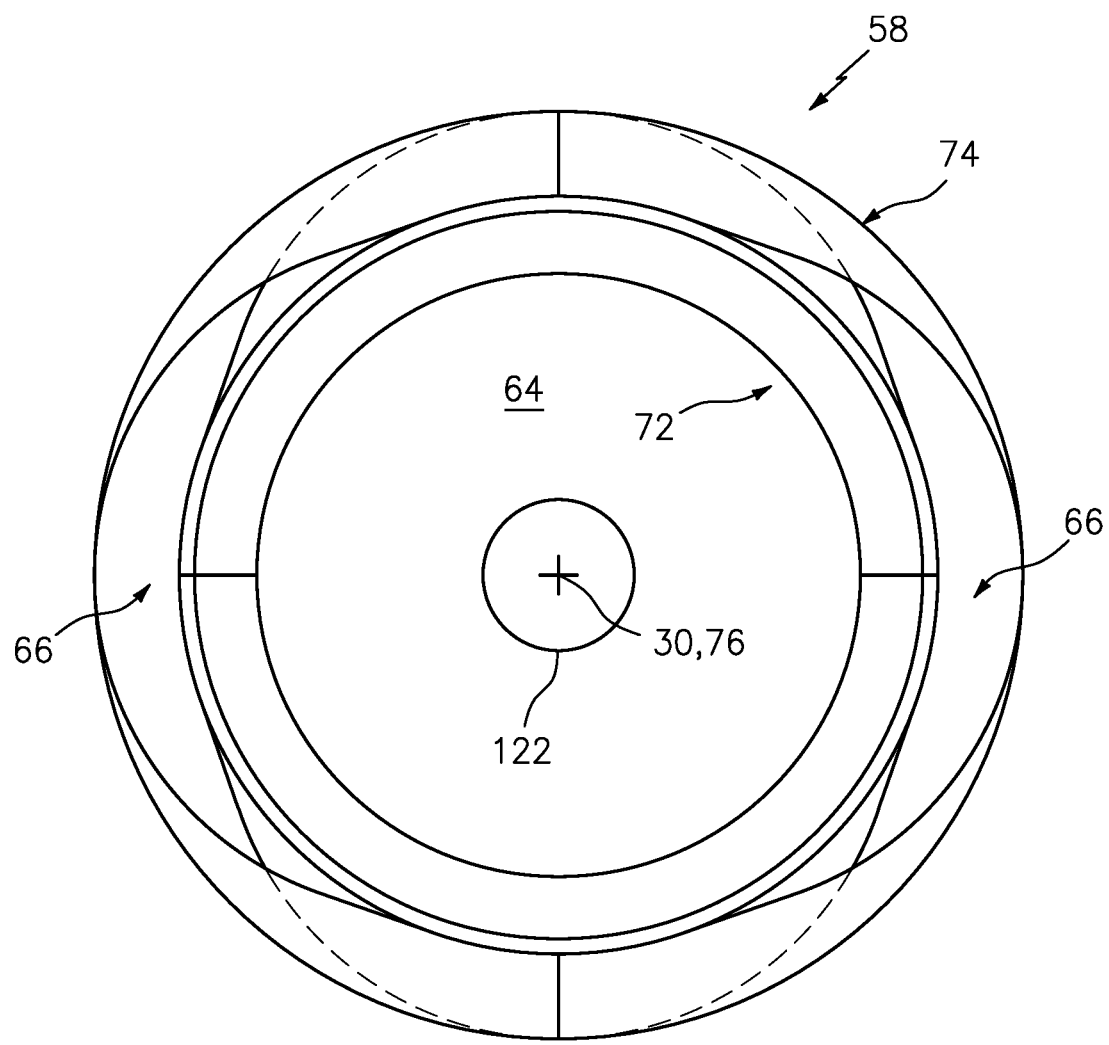
FIG. 9 is a front view illustration of the nacelle inlet structure configured with an annular inlet opening.

In some embodiments, referring to FIGS. 1-3, the first inlet opening 64 is configured as a non-annular opening. The first inlet opening 64, for example, is not interrupted by another body; e.g., a nose cone, cap, etc. Alternatively, the first inlet opening 64 may be interrupted (e.g., pierced) by a center body 122 (e.g., a spike, a nosecone, a cap, etc.) which projects axially into or through the first inlet opening 64 (e.g., see FIG. 9). The first inlet opening 64 may thereby be configured as an annular inlet opening.

In some embodiments, referring to FIGS. 8A-8G, the movable structure 72 may rotate ninety degrees (90°) between its first and its second positions. However, in other embodiments, the movable structure 72 may rotate more than ninety degrees (e.g., between ninety degrees (90°) and one-hundred and eighty degrees (180°)) between the first and the second positions. In still other embodiments, the movable structure 72 may rotate less than ninety degrees (e.g., between ten (10°) and ninety degrees (90°)) between the first and the second positions.

In some embodiments, referring to FIGS. 8A-8G, the movable structure 72 may rotate counter-clockwise between its first and its second positions; e.g., when looking aft, downstream along the centerline 30/the axis 76. However, in other embodiments, the movable structure 72 may rotate clockwise between the first and the second positions; e.g., when looking aft, downstream along the centerline 30/the axis 76.

In some embodiments, the movable structure 72 may be actuated by a gear drive system. In other embodiments, the movable structure 72 may be actuated by one or more other types of actuators such as, but not limited to, one or more worm and gear arrangements and/or one or more linear actuators arranged around a periphery of the movable structure 72.

In some embodiments, the nacelle inlet structure 58 may be arranged (e.g., clocked about the axis 30/the centerline 30) such that the second inlet openings 66/the concave portions 116 are located on lateral sides of the nacelle inlet structure 58. In other embodiments, the nacelle inlet structure 58 may be arranged (e.g., clocked about the axis 30/the centerline 30) such that the second inlet openings 66/the concave portions 116 are located on top and bottom sides of the nacelle inlet structure 58.

While the nacelle inlet structure 58 shown in the drawings is configured with two of the second inlet openings 66, the present disclosure is not limited to such an exemplary embodiment. In other embodiments, for example, the nacelle inlet structure 58 may include a single one of the second inlet openings 66. In still other embodiments, the nacelle inlet structure 58 may include more than two of the second inlet openings 66.

The structure 72 is described above as a movable structure, and the structure 74 is described above as a static structure. However, it is contemplated that the functionality/operation of these structures 72 and 74 may be reversed. For example, in some embodiments, the structure 72 may be configured as a static structure, and the structure 74 may be configured as a movable structure; e.g., a rotatable structure. The structure 74 may thereby move (e.g., rotate clockwise or counter-clockwise about the rotational axis 76) between the first and the second positions to open and close the one or more second inlet openings 66. In such embodiments as well as other embodiments, the inlet lip 86 may be formed by a static structure; e.g., the structure 72.

The aircraft propulsion system 20 and its nacelle inlet structure 58 may be configured with various gas turbine engines other than the one described above. The gas turbine engine 22, for example, may be configured as a geared or a direct drive turbine engine. The gas turbine engine 22 may be configured with a single spool, with two spools (e.g., see FIG. 1), or with more than two spools. The turbine engine 22 may be configured as a turbofan engine, a turbojet engine or any other type of turbine engine. The present invention therefore is not limited to any particular types or configurations of gas turbine engines. The present disclosure is also not limited to applications where the aircraft is capable to traveling supersonic speeds.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inlet structure including an inner inlet opening, an outer inlet opening and a rotating structure;
   the rotating structure extending circumferentially about the inner inlet opening;
   the rotating structure configured to rotate about an axis between a first position and a second position, wherein the rotating structure at least partially closes the outer inlet opening in the first position, and the rotating structure at least partially opens the outer inlet opening in the second position;

the rotating structure forming an outer peripheral boundary of the inner inlet opening; and the rotating structure forming an inner peripheral boundary of the outer inlet opening.

2. The assembly of claim 1, wherein the inner inlet opening is formed by an inner bore of the rotating structure.

3. The assembly of claim 1, wherein the inner inlet opening is a fixed area opening.

4. The assembly of claim 1, wherein the inner inlet opening is a non-annular opening.

5. The assembly of claim 1, wherein the axis is coaxial with an axial centerline of the nacelle inlet structure.

6. An assembly for an aircraft propulsion system, comprising:

a nacelle inlet structure including an inner inlet opening, an outer inlet opening and a rotating structure;

the rotating structure extending circumferentially about the inner inlet opening;

the rotating structure configured to rotate about an axis between a first position and a second position, wherein the rotating structure at least partially closes the outer inlet opening in the first position, and the rotating structure at least partially opens the outer inlet opening in the second position; and the rotating structure forming an inlet lip of the nacelle inlet structure.

7. An assembly for an aircraft propulsion system, comprising:

a nacelle inlet structure including an inner inlet opening, an outer inlet opening and a rotating structure;

the rotating structure extending circumferentially about the inner inlet opening;

the rotating structure configured to rotate about an axis between a first position and a second position, wherein the rotating structure at least partially closes the outer inlet opening in the first position, and the rotating structure at least partially opens the outer inlet opening in the second position;

the nacelle inlet structure further including a second outer inlet opening;

the rotating structure at least partially closing the second outer inlet opening in the first position; and the rotating structure at least partially opening the second outer inlet opening in the second position.

8. The assembly of claim 7, wherein the outer inlet opening and the second outer inlet opening are arranged on opposing sides of the inner inlet opening.

9. An assembly for an aircraft propulsion system, comprising:

a nacelle inlet structure including an inner inlet opening, an outer inlet opening and a rotating structure;

the rotating structure extending circumferentially about the inner inlet opening;

the rotating structure configured to rotate about an axis between a first position and a second position, wherein the rotating structure at least partially closes the outer inlet opening in the first position, and the rotating structure at least partially opens the outer inlet opening in the second position;

the nacelle inlet structure further including a static structure that extends circumferentially about the rotating structure; and the outer inlet opening radially between the rotating structure and the static structure.

10. The assembly of claim 9, wherein a forward edge of the static structure has a concave portion that forms an outer peripheral boundary of the outer inlet opening.

11. The assembly of claim 9, wherein the rotating structure includes a channel that extends axially along the rotating structure;

the static structure is configured to cover the channel in the first position; and the static structure is configured to uncover the channel in the second position.

12. The assembly of claim 1, wherein the inner inlet opening has an inner inlet opening flow area; and the outer inlet opening has an outer inlet opening flow area that is less than the inner inlet opening flow area.

* * * * *